United States Patent
Sand

(10) Patent No.: US 11,713,787 B2
(45) Date of Patent: Aug. 1, 2023

(54) FLEXIBLE COUPLING FOR TORQUE TRANSMISSION

(71) Applicant: NABORS LUX 2 SARL, Luxembourg (LU)

(72) Inventor: Siamak Sand, Stavanger (NO)

(73) Assignee: NABORS LUX 2 SARL, Luxembourg (LU)

( * ) Notice: Subject to any disclaimer, the term of this patent is extended or adjusted under 35 U.S.C. 154(b) by 244 days.

(21) Appl. No.: 17/071,771

(22) Filed: Oct. 15, 2020

(65) Prior Publication Data

US 2021/0123480 A1 Apr. 29, 2021

Related U.S. Application Data

(60) Provisional application No. 62/926,184, filed on Oct. 25, 2019.

(51) Int. Cl.
*F16D 3/72* (2006.01)
*F16D 3/60* (2006.01)

(52) U.S. Cl.
CPC ............. *F16D 3/72* (2013.01); *F16D 3/60* (2013.01); *Y10S 29/048* (2013.01); *Y10T 403/70* (2015.01)

(58) Field of Classification Search
CPC . F16D 3/72; F16D 3/60; Y10S 29/048; Y10T 403/70

USPC ............................ 464/69, 148, 152; 403/345
See application file for complete search history.

(56) References Cited

U.S. PATENT DOCUMENTS

| 779,930 | A | * | 1/1905 | Halle | B60B 9/20 |
| | | | | | 464/148 |
| 987,878 | A | * | 3/1911 | Hormby | F16C 1/04 |
| | | | | | 464/148 |
| 1,622,772 | A | * | 3/1927 | Dunn | F16C 1/04 |
| | | | | | 464/148 |
| 1,976,131 | A | * | 10/1934 | Kittredge | F16D 3/60 |
| 4,125,028 | A | * | 11/1978 | Gordon | H03J 1/06 |
| | | | | | 464/69 |

OTHER PUBLICATIONS

Universal Joint and Driveshaft Design Manual, AE-7, Society of Automotive Engineers, Inc., Warrendale, PA, Chapter 7, pp. 209-211. TJ1079.62. (Year: 1979).*

* cited by examiner

*Primary Examiner* — Greg Binda
(74) *Attorney, Agent, or Firm* — Ewing & Jones, PLLC

(57) ABSTRACT

A flexible coupling includes an input coupler including an inner face, an output coupler including an inner face, and a plurality of rigid linkages. Each rigid linkage is coupled between an input attachment point coupled to the inner face of the input coupler and an output attachment point coupled to the inner face of the output coupler. Each rigid linkage is pivotably and slidably coupled to the input attachment point and the output attachment point.

16 Claims, 15 Drawing Sheets

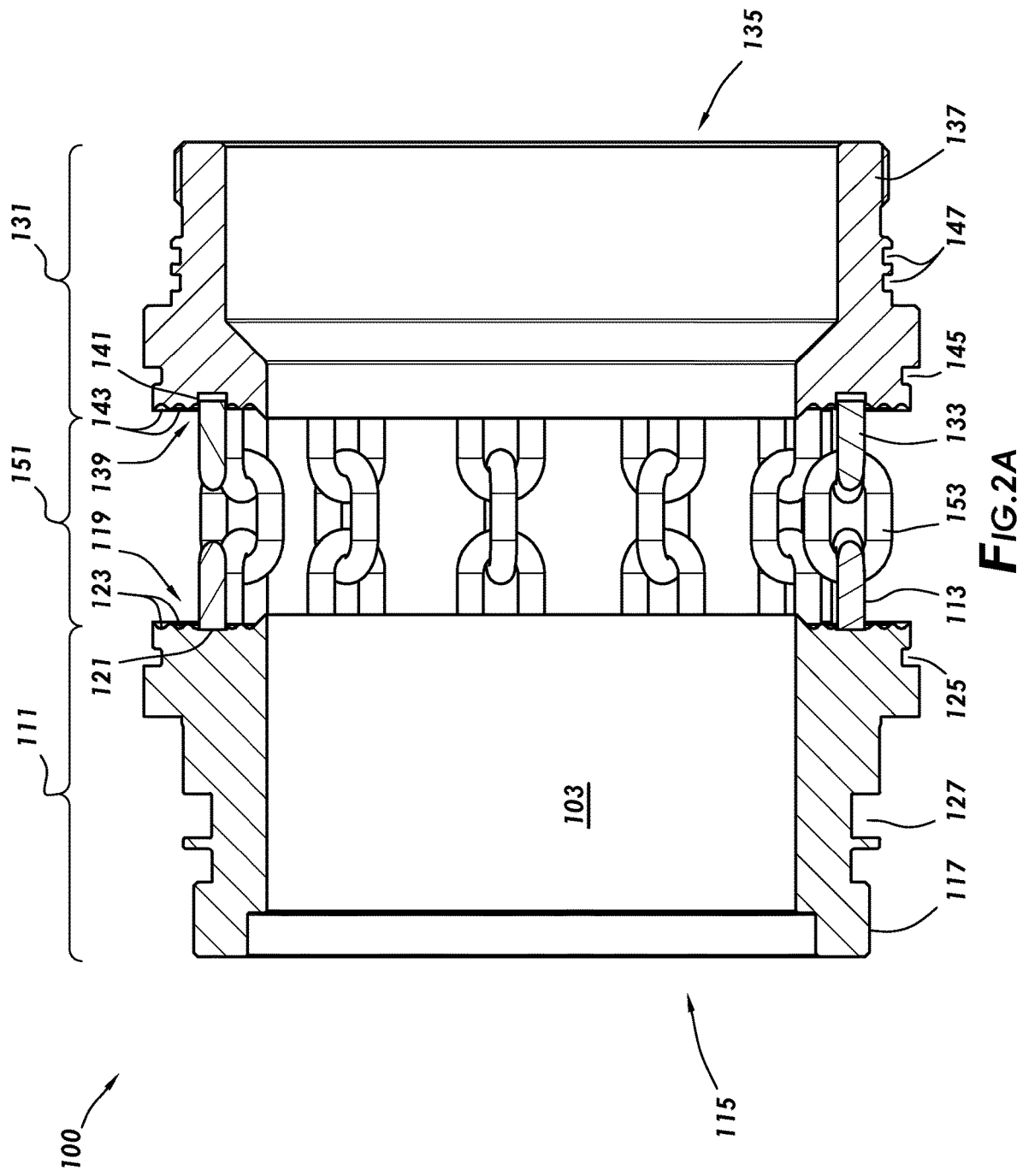

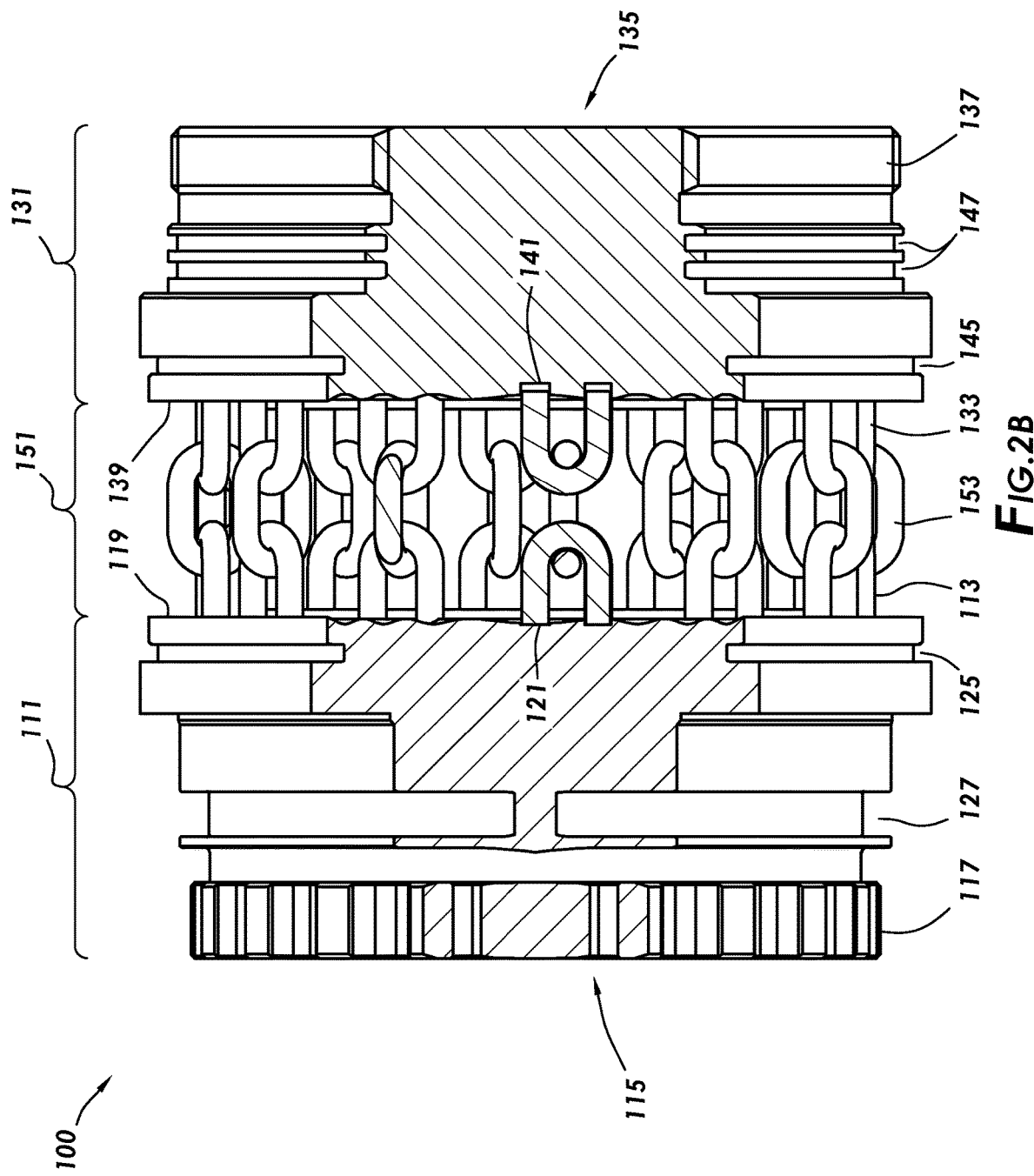

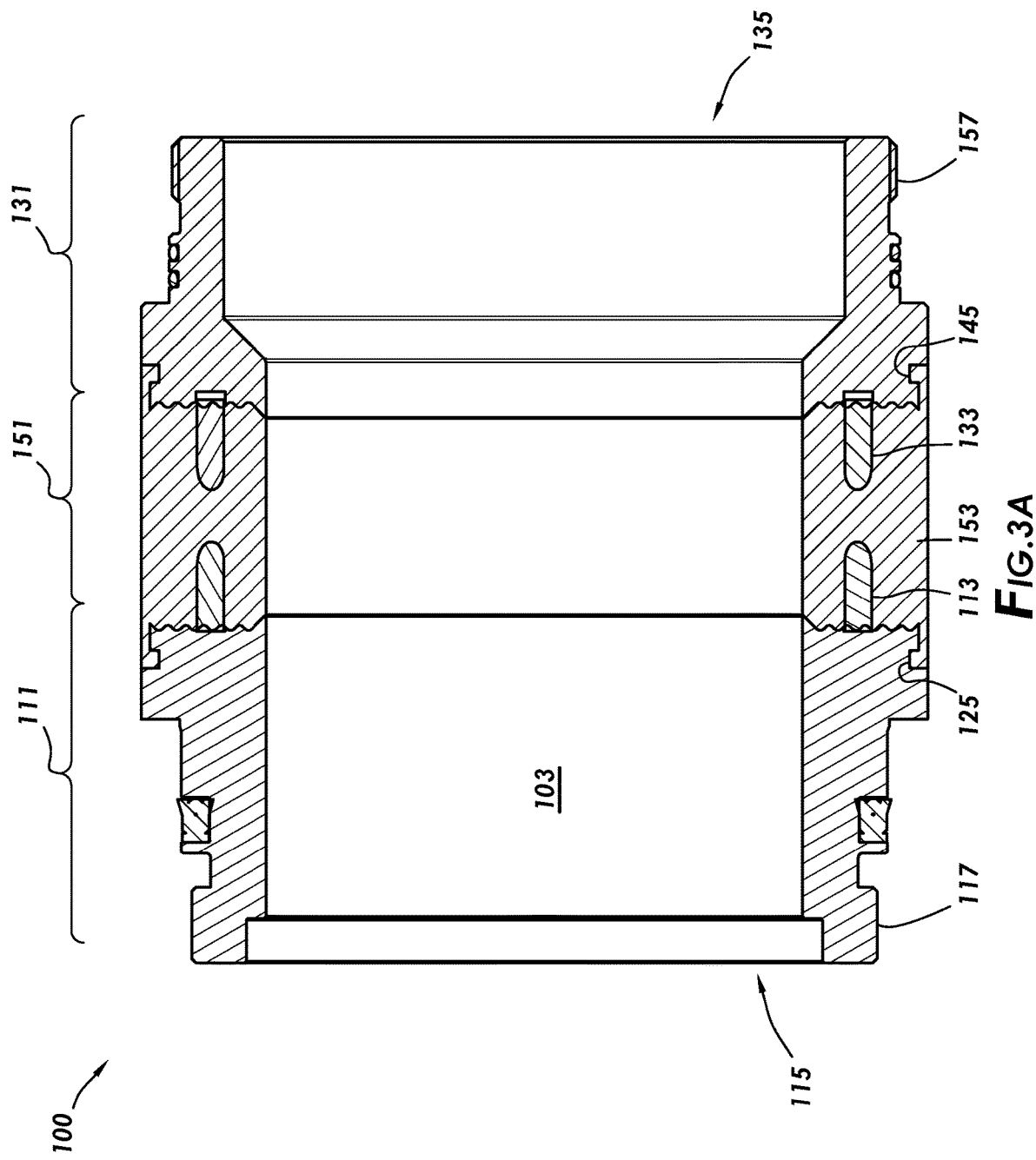

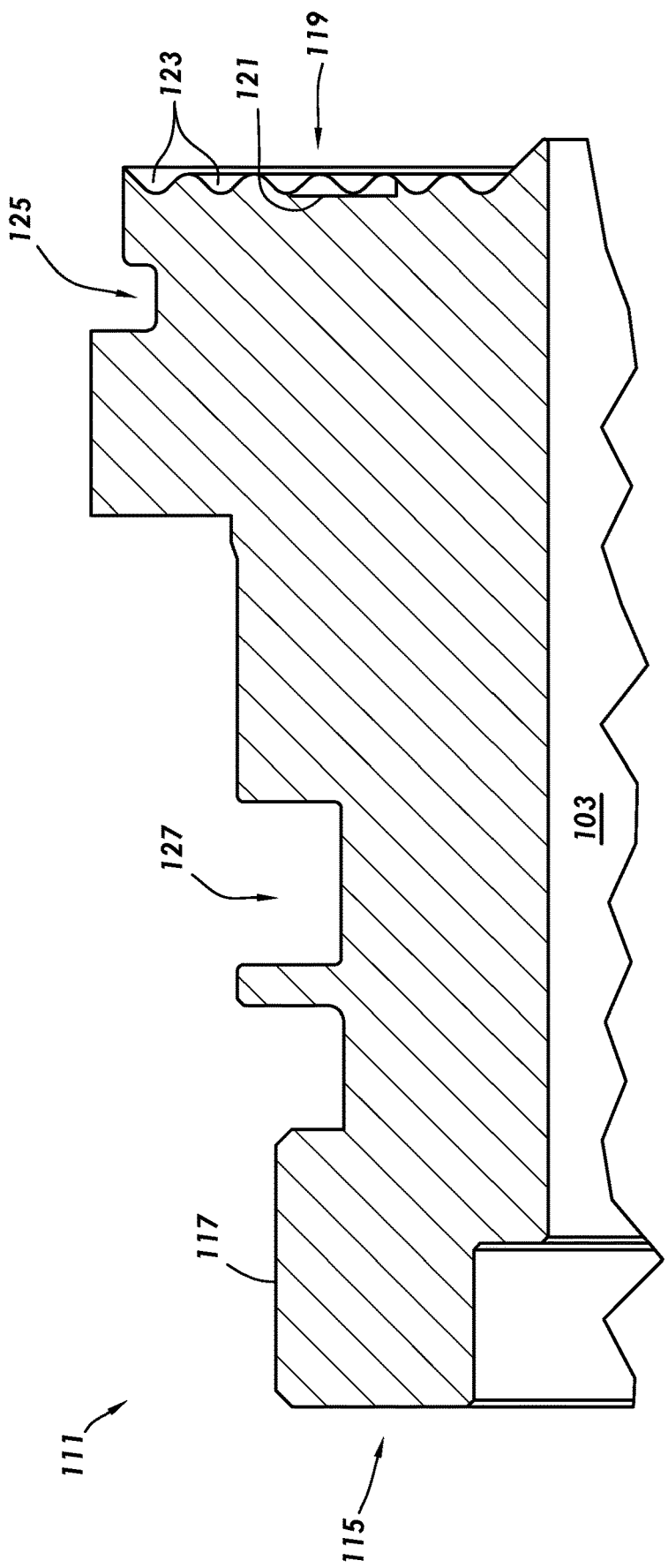

FLEXIBLE COUPLING FOR TORQUE TRANSMISSION

CROSS-REFERENCE TO RELATED APPLICATIONS

This application is a non-provisional application which claims priority from U.S. provisional application No. 62/926,184, filed Oct. 25, 2019, which is incorporated by reference herein in its entirety.

TECHNICAL FIELD/FIELD OF THE DISCLOSURE

The present disclosure relates generally to torque transmission couplings, and specifically to flexible couplings for torque transmission.

BACKGROUND OF THE DISCLOSURE

In many tools, transfer of rotational and torsional forces between components is necessary. In some such tools, angular, longitudinal, and radial offsets between rotating members may be encountered during use of the tool. For example, while forming a wellbore using a rotary steerable system (RSS), forces on the bottom hole assembly while in operation may cause bending or other deformation of the RSS between a motor and the steering mechanism. In such a case, a flexible coupling may be used to transfer torque and rotation between the motor and the steering mechanism irrespective of the deformation of the RSS.

SUMMARY

The present disclosure provides for a flexible coupling. The flexible coupling may include an input coupler including an inner face. The flexible coupling may include an output coupler including an inner face. The flexible coupling may include a plurality of rigid linkages. Each rigid linkage may be coupled between an input attachment point coupled to the inner face of the input coupler and an output attachment point coupled to the inner face of the output coupler. Each rigid linkage may be pivotably and slidably coupled to the input attachment point and the output attachment points.

The present disclosure also provides for a method of assembling a flexible coupling. The method may include providing an input coupler including an inner face. The method may include providing an output coupler including an inner face. The method may include providing a plurality of rigid linkages, linking each rigid linkage of the plurality of rigid linkages to an input attachment point, coupling each input attachment point to the inner face of the input coupler, linking each rigid linkage of the plurality of rigid linkages to an output attachment point, and coupling each output attachment point to the inner face of the output coupler.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2A depicts a cross sectional view of the flexible coupling of FIG. 2 taken at line A-A.

FIG. 2B depicts a cross sectional view of the flexible coupling of FIG. 2 taken at line B-B.

FIG. 3A depicts a cross sectional view of the flexible coupling of FIG. 3 taken at line C-C.

FIG. 4B depicts a partial cross section view of the input coupler of FIG. 4.

DETAILED DESCRIPTION

Figure 1:
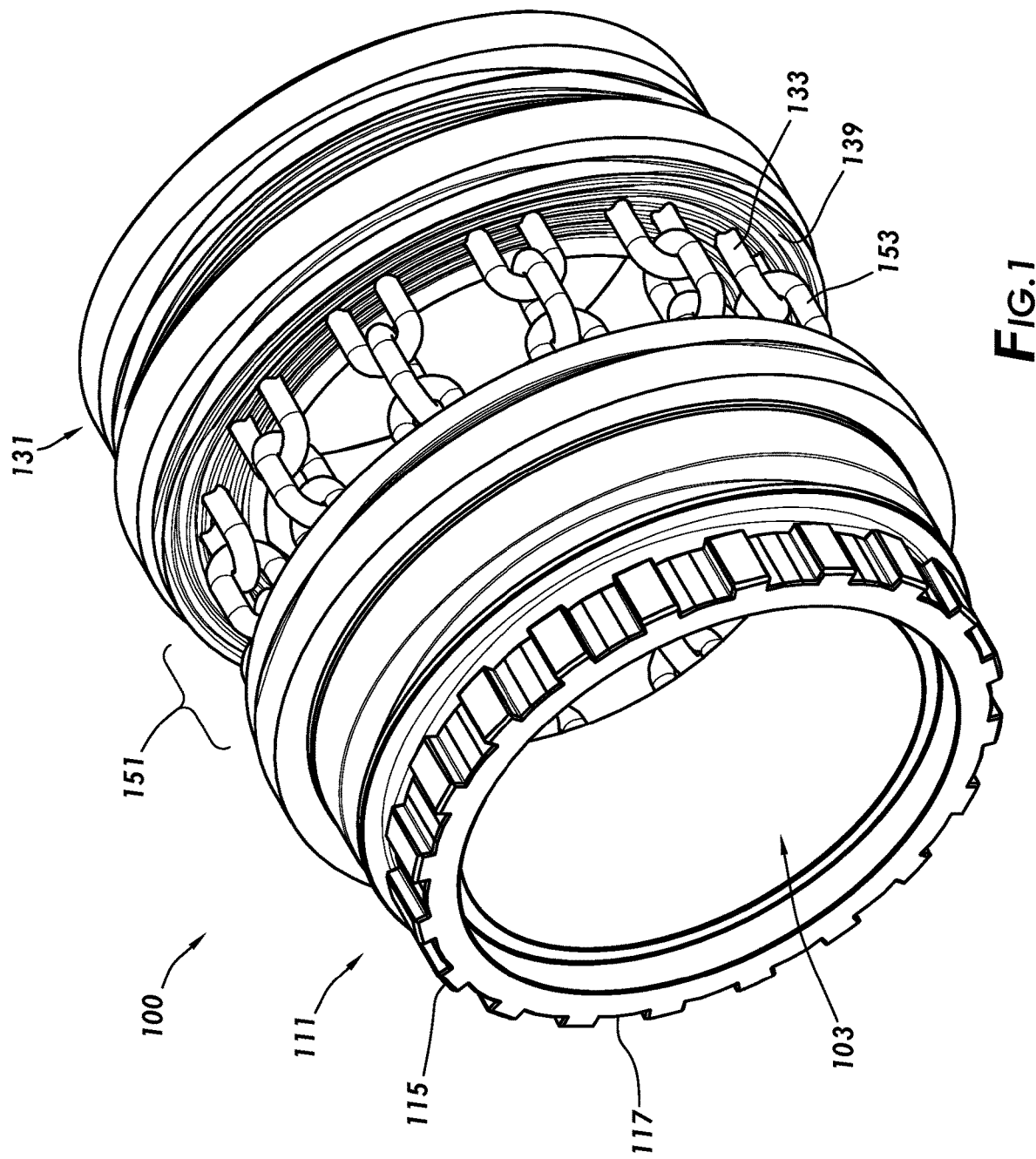
FIG. 1 depicts a perspective view of a flexible coupling consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts flexible coupling 100 consistent with at least one embodiment of the present disclosure. Flexible coupling 100 may include input coupler 111 and output coupler 131. Flexible coupling 100 may be used to transfer torque and rotational motion between input coupler 111 and output coupler 131. In some embodiments, input coupler 111 may be coupled to a rotational input such as a motor as further discussed below, and flexible coupling 100 may transfer the rotational input to output coupler 131. In some embodiments, flexible coupling 100 may allow for parallel and angular displacement or misalignment between input coupler 111 and output coupler 131 as further discussed below. In some embodiments, input coupler 111 and output coupler 131 may be generally tubular in shape, defining inner bore 103 of flexible coupling 100. In such embodiments, other tools or components of tools including, for example and without limitation, shafts may be passed through flexible coupling 100 through inner bore 103.

Figure 2:
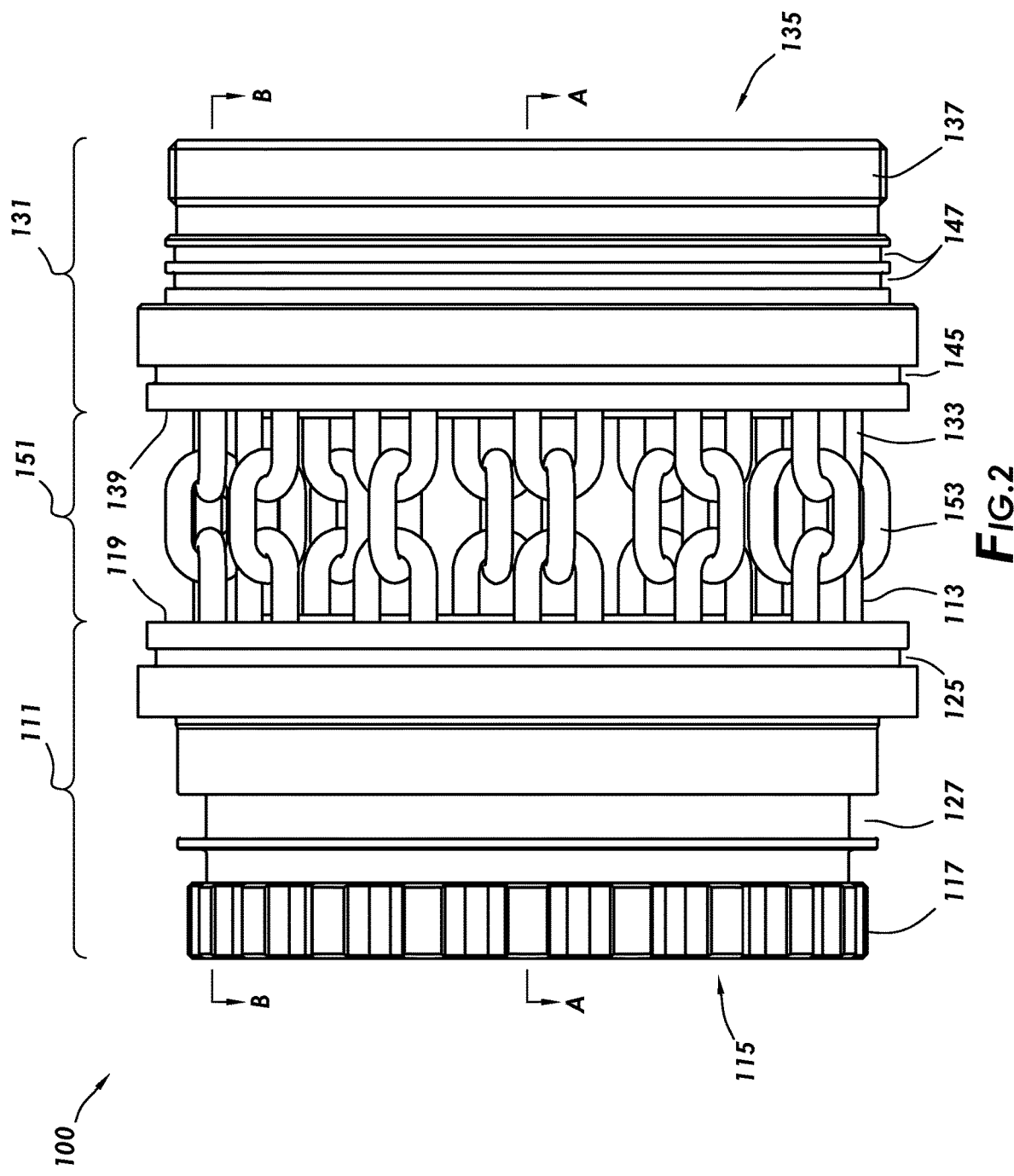
FIG. 2 depicts a side view of the flexible coupling of FIG. 1.

In some embodiments, as shown in FIGS. 2, 2A, and 2B, input coupler 111 and output coupler 131 may be coupled to each other by flexible linkage assembly 151. In some embodiments, flexible linkage assembly 151 may be annular or tubular in shape or may otherwise not extend into inner bore 103 of flexible coupling 100. Flexible linkage assembly 151 may include one or more rigid linkages 153 positioned to couple between input coupler 111 and output coupler 131. In some embodiments, rigid linkages 153 of flexible linkage assembly 151 may be a plurality of chain links. Rigid linkages 153 may extend between corresponding input attachment points 113 and output attachment points 133. In some embodiments, input attachment points 113 may be half chain links welded to input coupler 111. In some embodiments, output attachment points 133 may be half chain links welded to output coupler 131. Rigid linkages 153 may be coupled to input attachment points 113 and output attachment points 133 such that rigid linkages are free to pivot and move longitudinally relative to input attachment points 113 and output attachment points 133.

Figure 3:
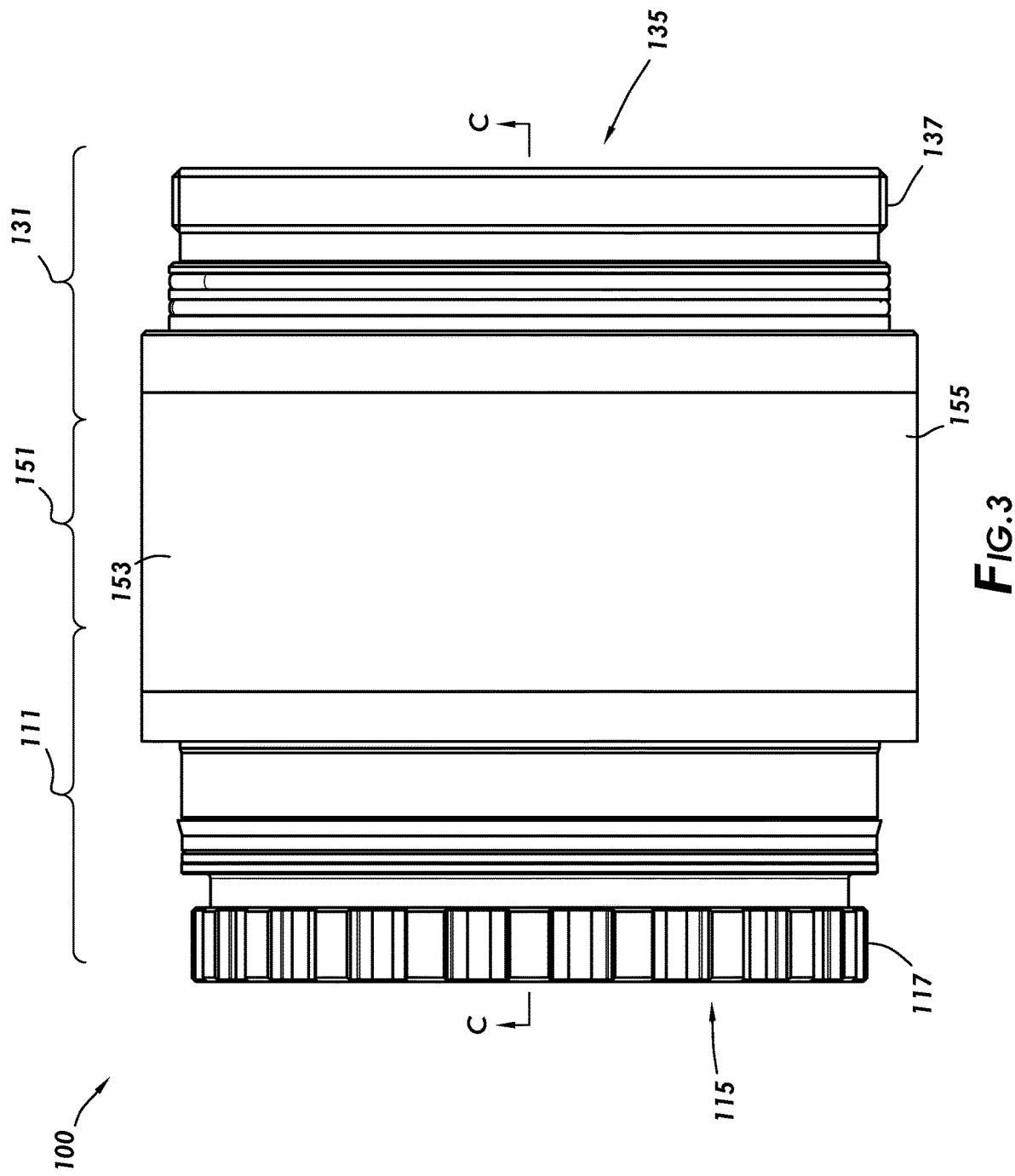
FIG. 3 depicts a side view of a flexible coupling consistent with at least one embodiment of the present disclosure.

In some embodiments, as shown in FIGS. 3, 3A, flexible linkage assembly 151 may include flexible linkage 155. In some embodiments, flexible linkage 155 may be formed from an elastomeric material such as rubber. In some embodiments, flexible linkage 155 may be molded into the space between input coupler 111 and output coupler 131 and about rigid linkages 153 such as chain links. In some embodiments, flexible linkage 155 may, for example and without limitation, inhibit contact between rigid linkages 153 and any fluid within or about flexible coupling 100. In some embodiments, without being bound to theory, flexible linkage 155 may apply a preloading force on rigid linkages 153 to, for example and without limitation, inhibit buckling of rigid linkages 153 and resist twisting or other unwanted movement of rigid linkages 153. In some embodiments, without being bound to theory, flexible linkage 155 may damp transmission of vibration or shock loading between input coupler 111 and output coupler 131 caused by torsional, longitudinal, or radial forces on input coupler 111 and output coupler 131.

Figure 4:
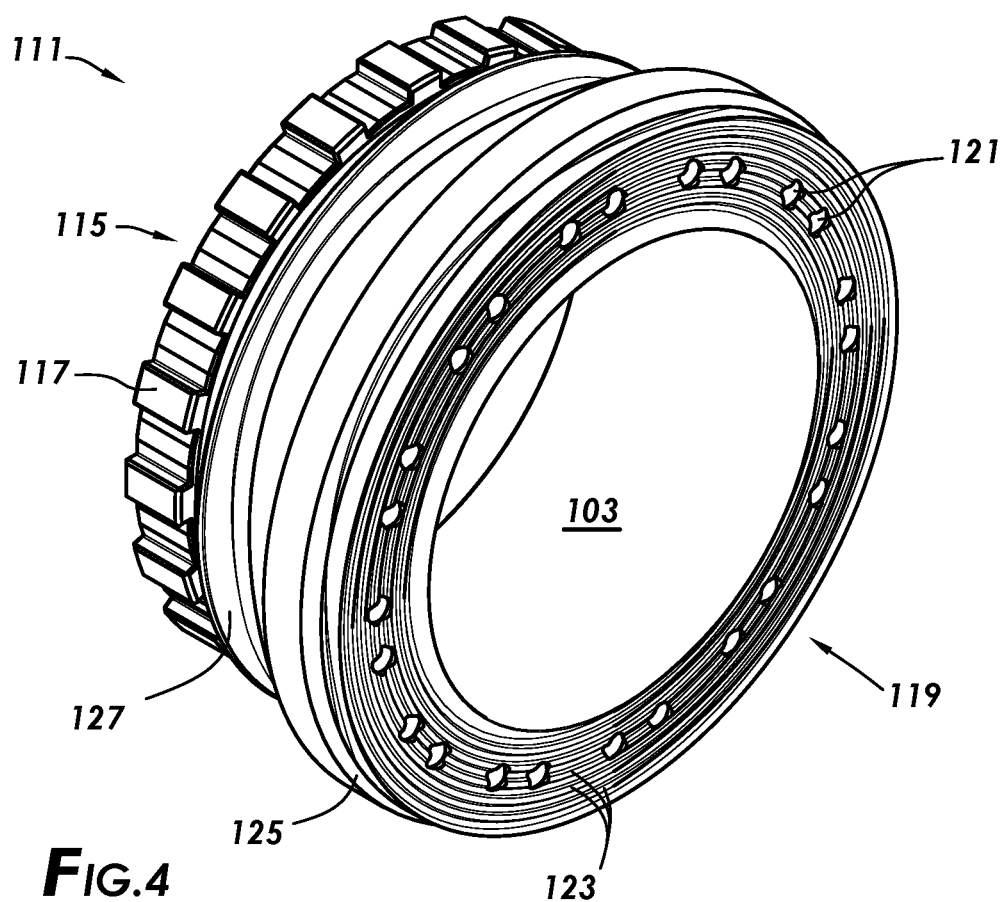
FIG. 4 depicts a perspective view of an input coupler of the flexible coupling of FIG. 1 consistent with at least one embodiment of the present disclosure.
Figure 4A:
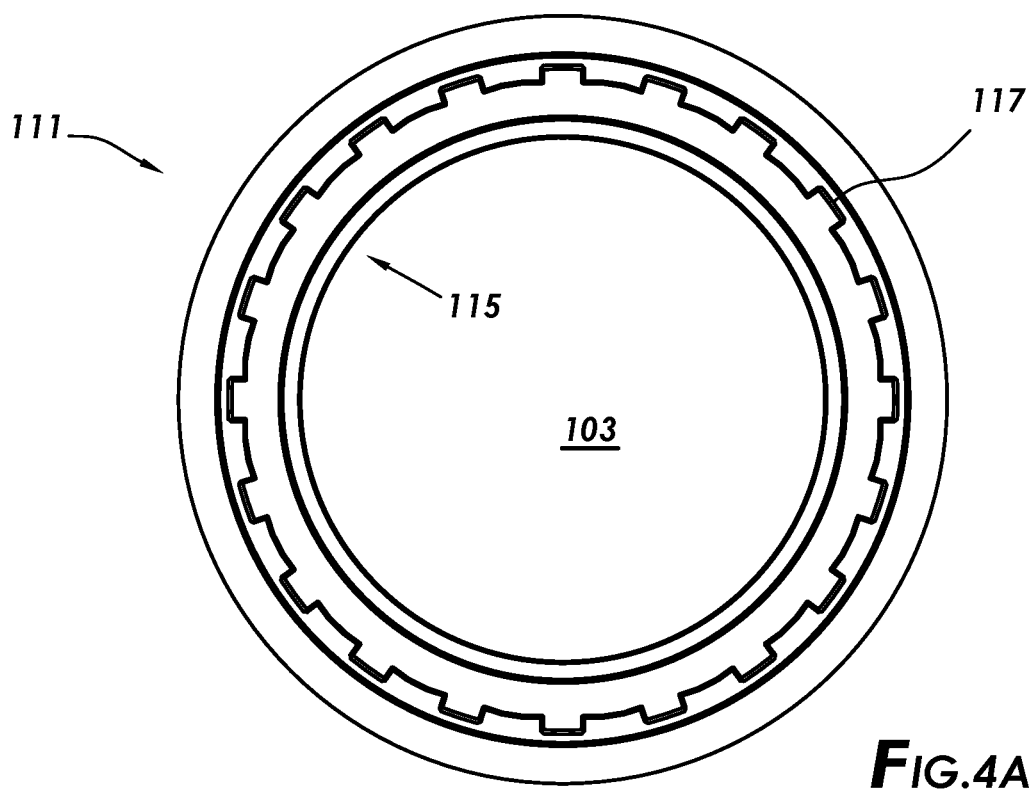
FIG. 4A depicts an end view of the input coupler of FIG. 4.

FIGS. 4, 4A, 4B depict input coupler 111 consistent with at least one embodiment of the present disclosure. Input coupler 111 may include input adapter 115. Input adapter 115 may allow for rotational and torsional forces from an external rotational device such as a motor to be applied to input coupler 111. In some embodiments, as shown in FIGS. 4, 4A, 4B, input adapter 115 may include spline 117. Spline 117 may be adapted to couple to a mating spline of the external rotation device to allow for torque transfer to input adapter 115.

In some embodiments, input coupler 111 may include inner face 119. Inner face 119 may be the portion of input coupler 111 that faces flexible linkage assembly 151 when flexible coupling 100 is assembled. In some embodiments, inner face 119 may include one or more mounting holes 121 formed on inner face 119. Mounting holes 121 may be positioned to receive input attachment points 113. In some embodiments, mounting holes 121 may be blind holes of a predetermined depth selected to adequately seat input attachment points 113. In some embodiments, input attachment points 113 may be welded to inner face 119 of input coupler 111.

In some embodiments, inner face 119 of input coupler 111 may include one or more surface features. In some embodiments, as depicted in FIGS. 4, 4B, inner face 119 of input coupler 111 may include one or more grooves 123 formed on inner face 119 to, for example and without limitation, increase the surface area of inner face 119. Grooves 123 may, for example and without limitation and without being bound to theory, provide additional surface area for inner face 119 to which flexible linkage 155 may adhere. Although depicted as circumferentially-formed grooves 123, inner face 119 may include one or more of radial grooves, straight grooves, or other texturing, roughing, knurling or other features for increasing surface area of inner face 119.

In some embodiments, input coupler 111 may include retention slot 125. Retention slot 125 may be formed on a surface of input coupler proximate inner face 119. Retention slot 125 may, for example and without limitation, receive at least part of flexible linkage 155 (as shown in FIG. 2B) where flexible linkage 155 is molded to input coupler 111. Retention slot 125 may, for example and without limitation, reduce or impede separation between input coupler 111 and flexible linkage 155 during operation of flexible coupling 100.

In some embodiments, input coupler 111 may include one or more features used to couple or attach other elements of flexible coupling 100 to input coupler 111. For example, in some embodiments, input coupler 111 may include seal slot 127 positioned to receive a seal such as an O-ring or wiper assembly. In some embodiments, such a seal or wiper assembly may allow for a fluid seal to be formed between input coupler 111 and a tubular housing external to flexible coupling 100.

Figure 5:
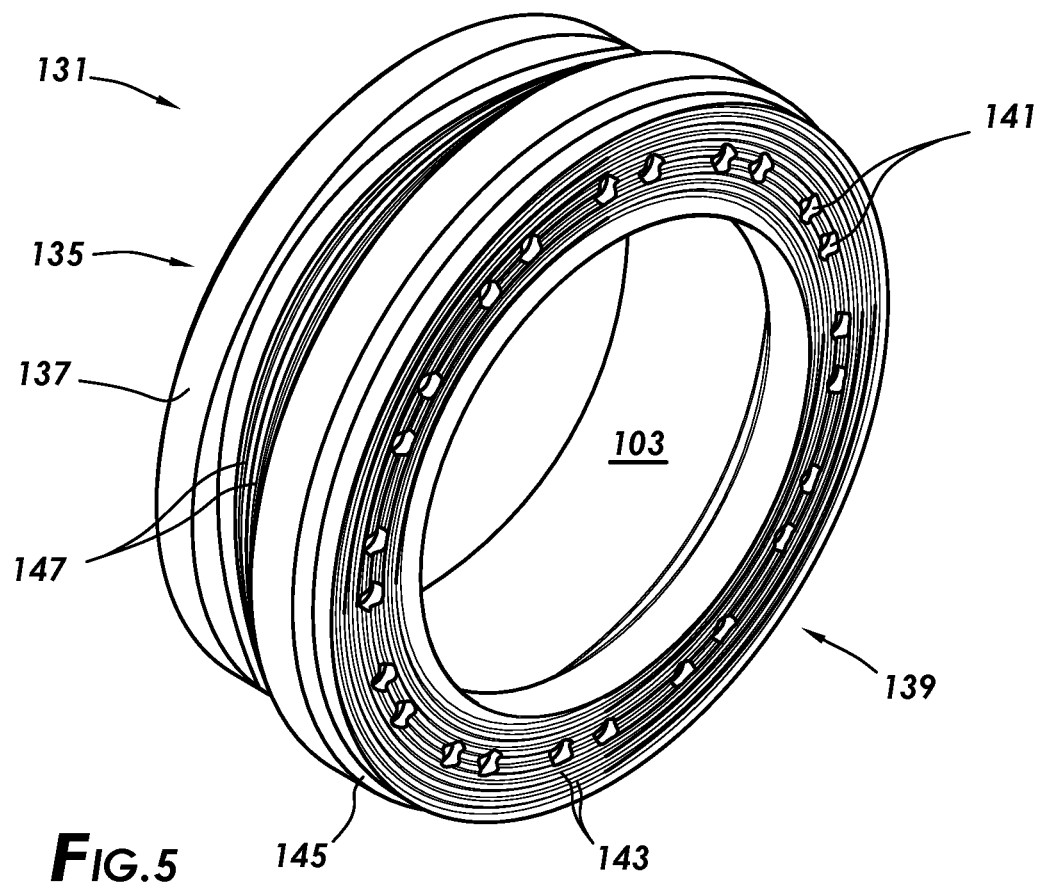
FIG. 5 depicts a perspective view of an output coupler of the flexible coupling of FIG. 1 consistent with at least one embodiment of the present disclosure.
Figure 5A:
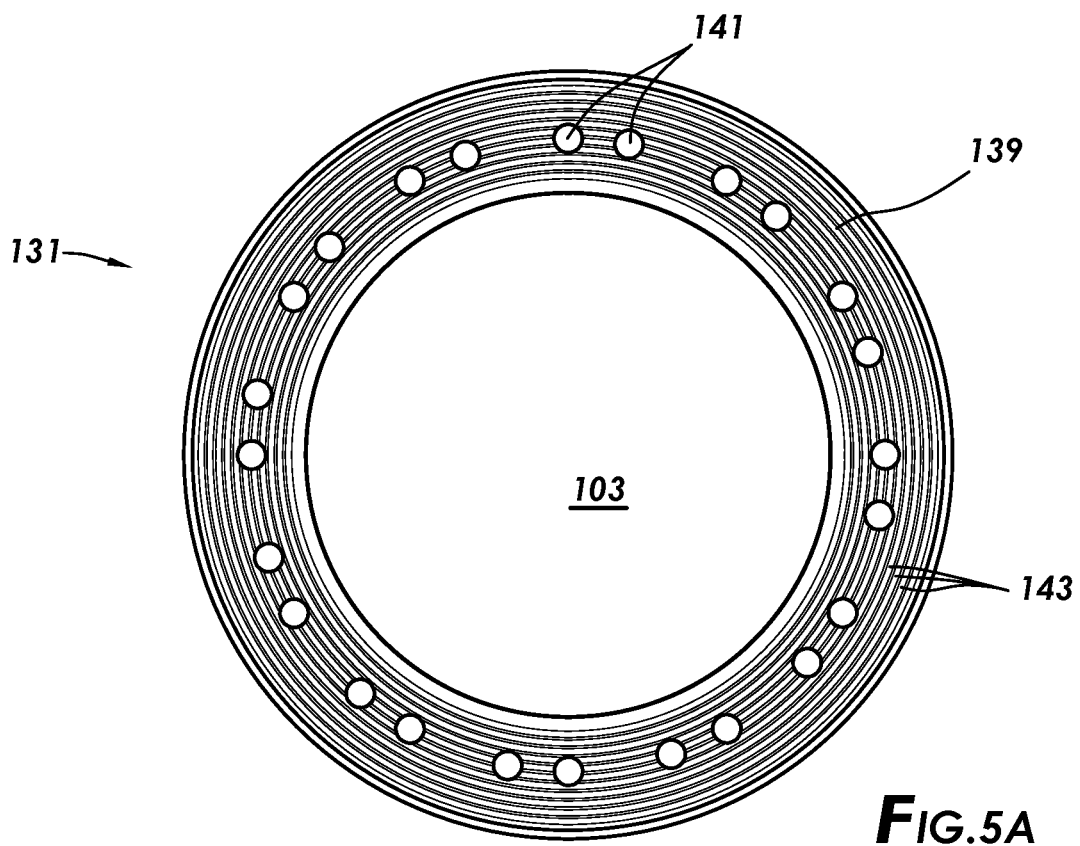
FIG. 5A depicts an end view of the output coupler of the flexible coupling of FIG. 5.
Figure 5B:
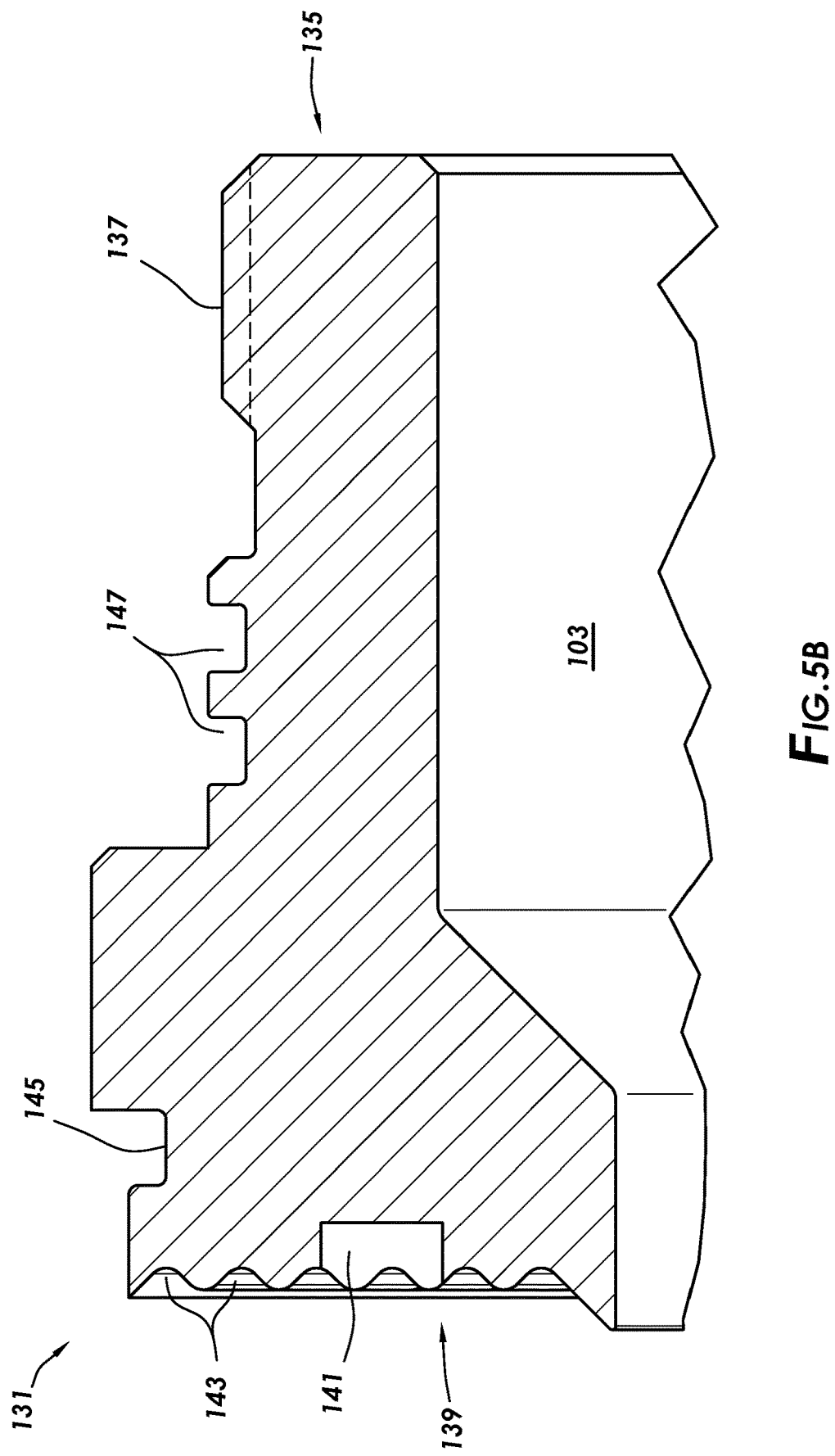
FIG. 5B depicts a partial cross section view of the output coupler of FIG. 5.

FIGS. 5, 5A, 5B depict output coupler 131 consistent with at least one embodiment of the present disclosure. Output coupler 131 may include output adapter 135. Output adapter 135 may allow for rotational and torsional forces from an external rotational device such as a motor to be applied to output coupler 131. In some embodiments, as shown in FIGS. 5, 5A, 5B, output adapter 135 may include threads 137. Threads 137 may be adapted to couple to a mating threaded connector of the external rotation device to allow for torque transfer to output adapter 135.

In some embodiments, output coupler 131 may include inner face 139. Inner face 139 may be the portion of output coupler 131 that faces flexible linkage assembly 151 when flexible coupling 100 is assembled. In some embodiments, inner face 139 may include one or more mounting holes 141 formed on inner face 139. Mounting holes 141 may be positioned to receive output attachment points 133. In some embodiments, mounting holes 141 may be blind holes of a predetermined depth selected to adequately seat output attachment points 133. In some embodiments, output attachment points 133 may be welded to inner face 139 of output coupler 131.

In some embodiments, inner face 139 of output coupler 131 may include one or more surface features. In some embodiments, as depicted in FIGS. 5, 5B, inner face 139 of output coupler 131 may include one or more grooves 143 formed on inner face 139 to, for example and without limitation, increase the surface area of inner face 139. Grooves 143 may, for example and without limitation and without being bound to theory, provide additional surface area for inner face 139 to which flexible linkage 155 may adhere. Although depicted as circumferentially-formed grooves 143, inner face 139 may include one or more of radial grooves, straight grooves, or other texturing, roughing, knurling or other features for increasing surface area of inner face 139.

In some embodiments, output coupler 131 may include retention slot 145. Retention slot 145 may be formed on a surface of input coupler proximate inner face 139. Retention slot 145 may, for example and without limitation, receive at least part of flexible linkage 155 (as shown in FIG. 2B) where flexible linkage 155 is molded to output coupler 131. Retention slot 145 may, for example and without limitation, reduce or impede separation between output coupler 131 and flexible linkage 155 during operation of flexible coupling 100.

In some embodiments, output coupler 131 may include one or more features used to couple or attach other elements of flexible coupling 100 to output coupler 131. For example, in some embodiments, output coupler 131 may include seal slots 147 positioned to receive one or more seal such as O-rings. In some embodiments, such seals may allow for a fluid seal to be formed between output coupler 131 and a tubular housing external to flexible coupling 100.

To assemble flexible coupling 100, input coupler 111 and output coupler 131 may be provided. Rigid linkages 153 may then be coupled between input coupler 111 and output coupler 131 using input attachment points 113 and output attachment points 133, respectively.

In some embodiments, input attachment points 113 may be linked to rigid linkages 153 and coupled to input coupler 111 before output attachment points 133 are coupled to output coupler 131. In some such embodiments, mounting holes 141 of output coupler 131 may be formed deeper than mounting holes 121 of input coupler 111. In such an embodiment, input attachment points 113 may be first welded to input coupler 111 at, for example and without limitation, the depth of mounting holes 121. Each rigid linkage 153 may be linked to output attachment points 133. Output attachment points 133 may then be seated within mounting holes 141 of inner face 139 of output coupler 131 at a depth consistent with the desired spacing between input coupler 111 and output coupler 131. Output attachment points 133 may then be welded to inner face 139 of output coupler 131. For example, in some such embodiments, input coupler 111 and output coupler 131 may be held in a fixture that establishes the desired spacing during the assembly process.

Alternatively, where output attachment points 133 coupled to output coupler 131 before input attachment points 113 are coupled to input coupler 111, mounting holes 121 may be formed deeper than mounting holes 141, and the above-described operations could be similarly undertaken.

In some embodiments, once input coupler 111 is coupled to output coupler 131 with rigid linkages 153, flexible linkage 155 may be installed. In some embodiments, flexible linkage 155 may be molded into the space between input coupler 111 and output coupler 131. In some embodiments, flexible linkage 155 may also flow into retention slots 125, 145. In some embodiments, rigid linkages 153 may be pretensioned during the installation of flexible linkage 155. For example, in some such embodiments, a longitudinal force may be applied on one or both of input coupler 111 and output coupler 131 to apply tension to rigid linkages 153.

Figure 6:
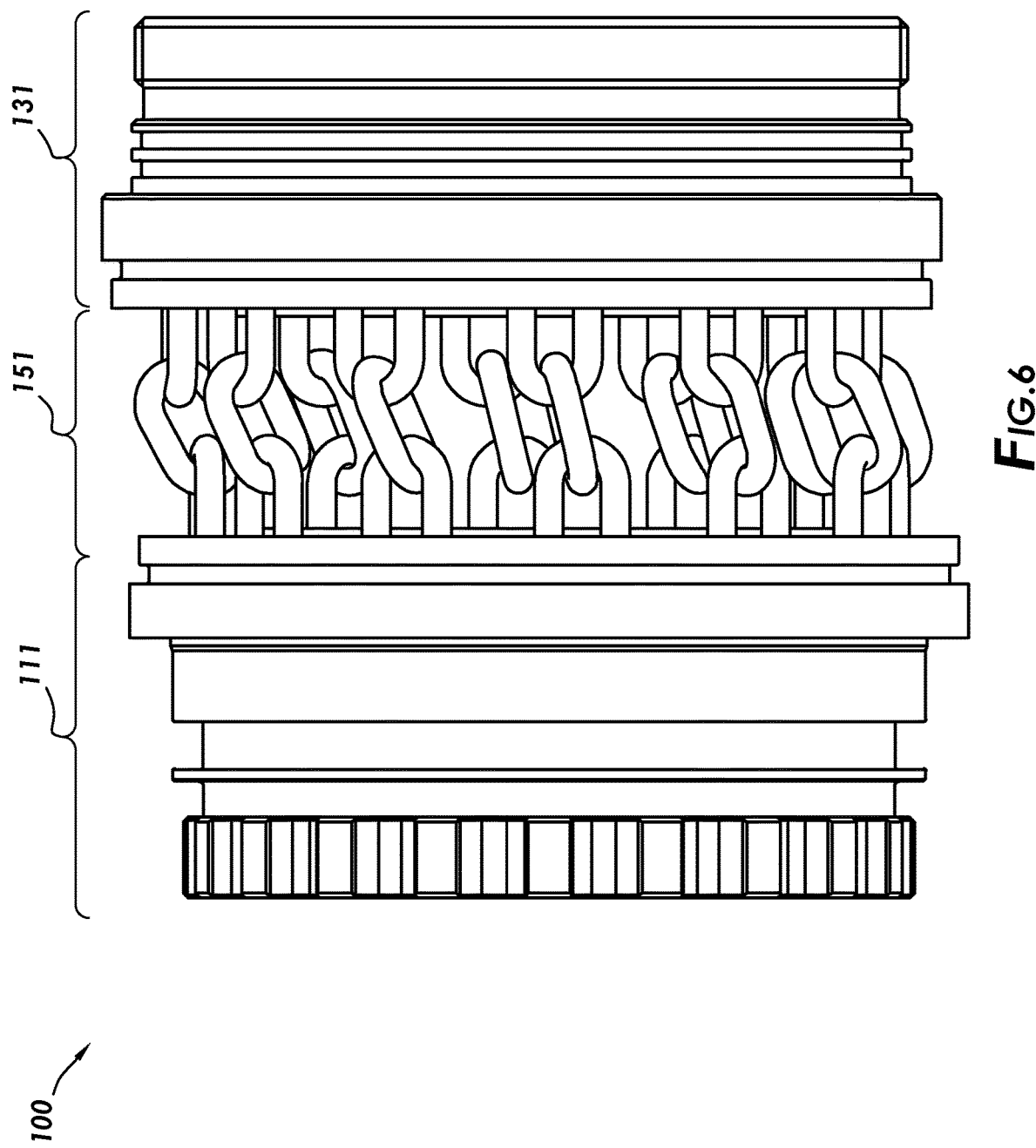
FIG. 6 depicts the flexible coupling of FIG. 1 in a configuration with a parallel offset between the input coupler and the output coupler.
Figure 7:
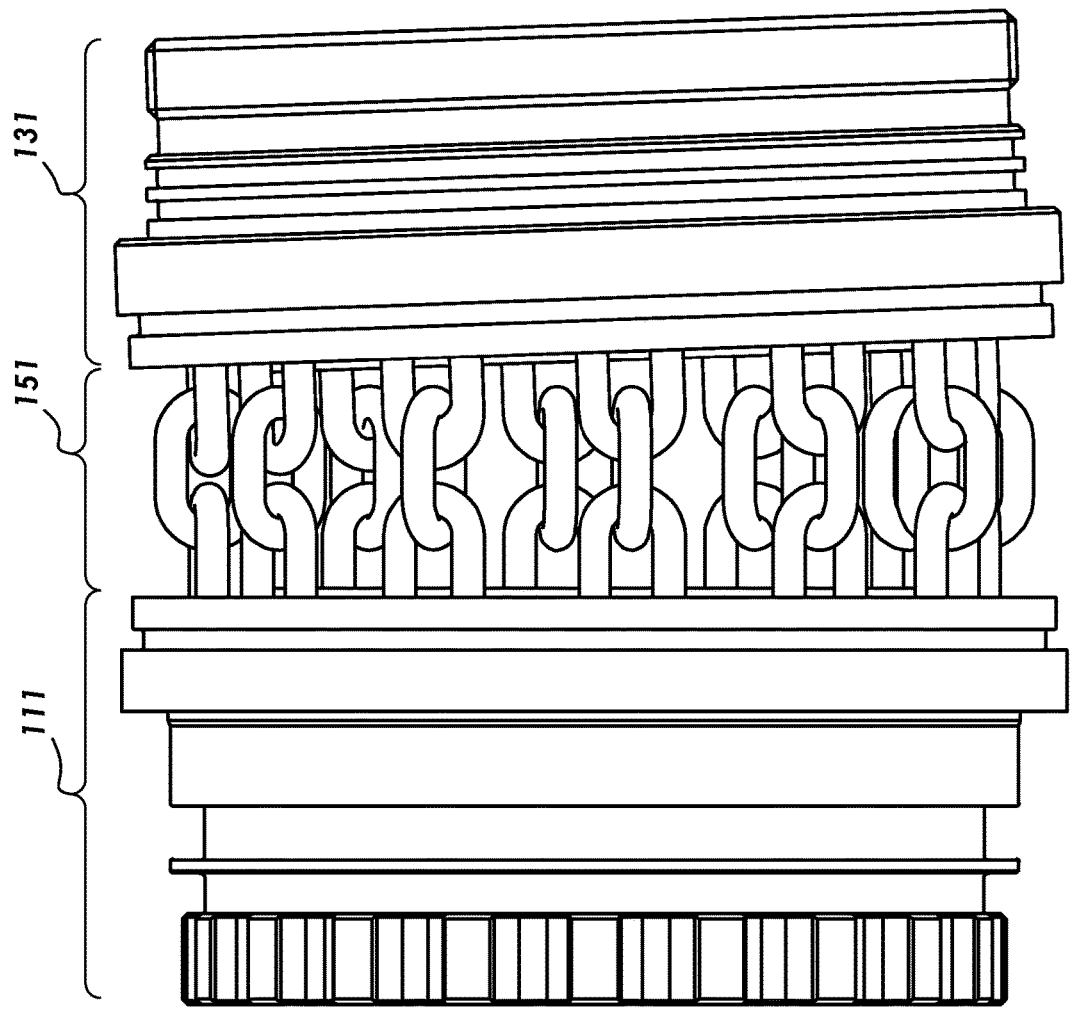
FIG. 7 depicts the flexible coupling of FIG. 1 in a configuration with an angular offset between the input coupler and the output coupler.

Once assembled, flexible coupling 100 may be used to transfer torque applied to input coupler 111 to output coupler 131 through flexible linkage assembly 151. Because rigid linkages 153 are able to pivot and move longitudinally relative to input attachment points 113 and output attachment points 133, misalignment between input coupler 111 and output coupler 131 may be tolerated during operation of flexible coupling 100. For example FIG. 6 depicts flexible coupling 100 in operation where output coupler 131 is radially displaced relative to input coupler 111. FIG. 7 depicts flexible coupling 100 in operation where output coupler 131 is angularly offset from input coupler 111. In each case or in a combination of the two, rigid linkages 153 maintain coupling between input coupler 111 and output coupler 131, and therefore allow torque transfer through flexible coupling despite such misalignments.

Figure 8:
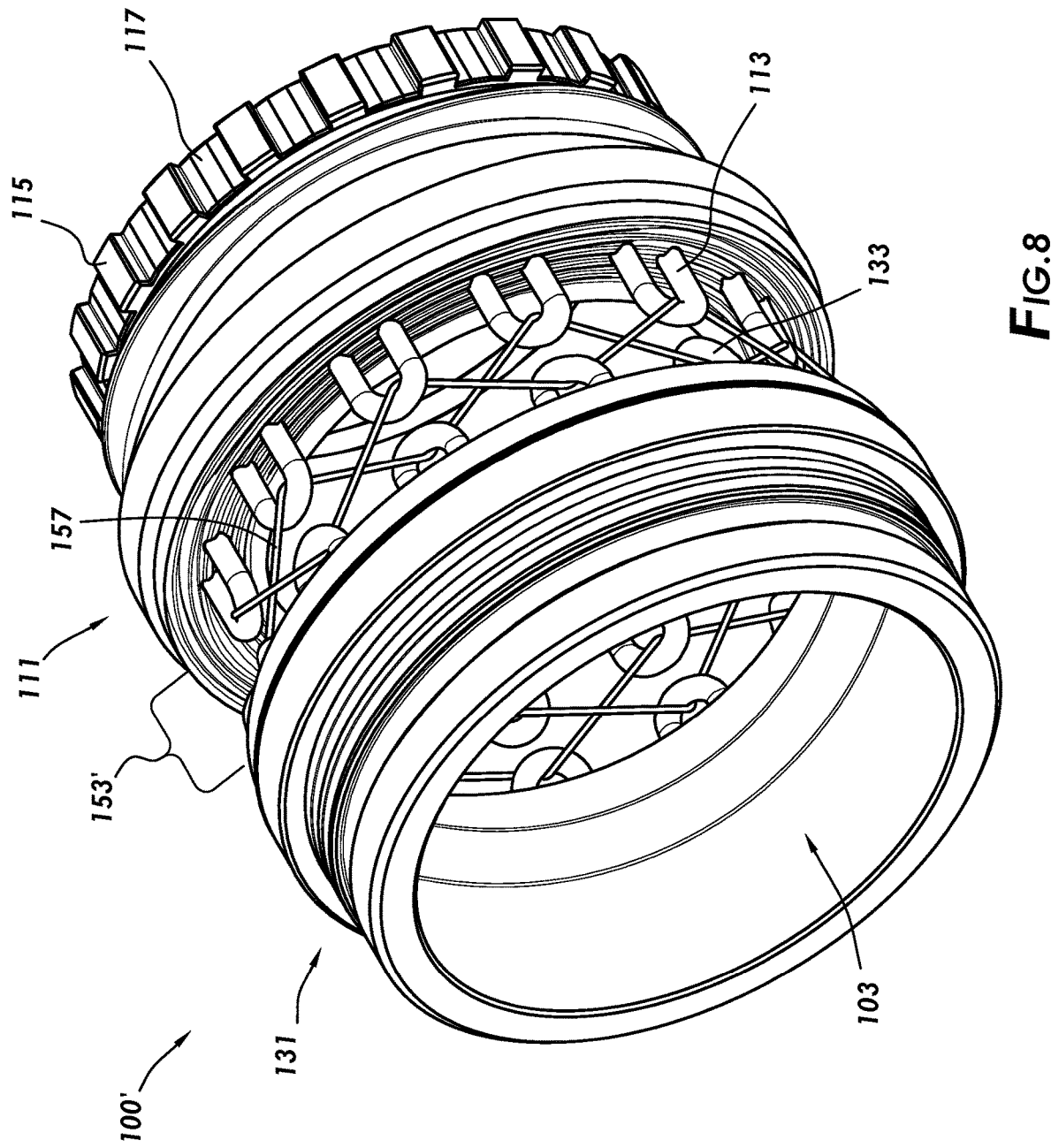
FIG. 8 depicts a flexible coupling consistent with at least one embodiment of the present disclosure.
Figure 9:
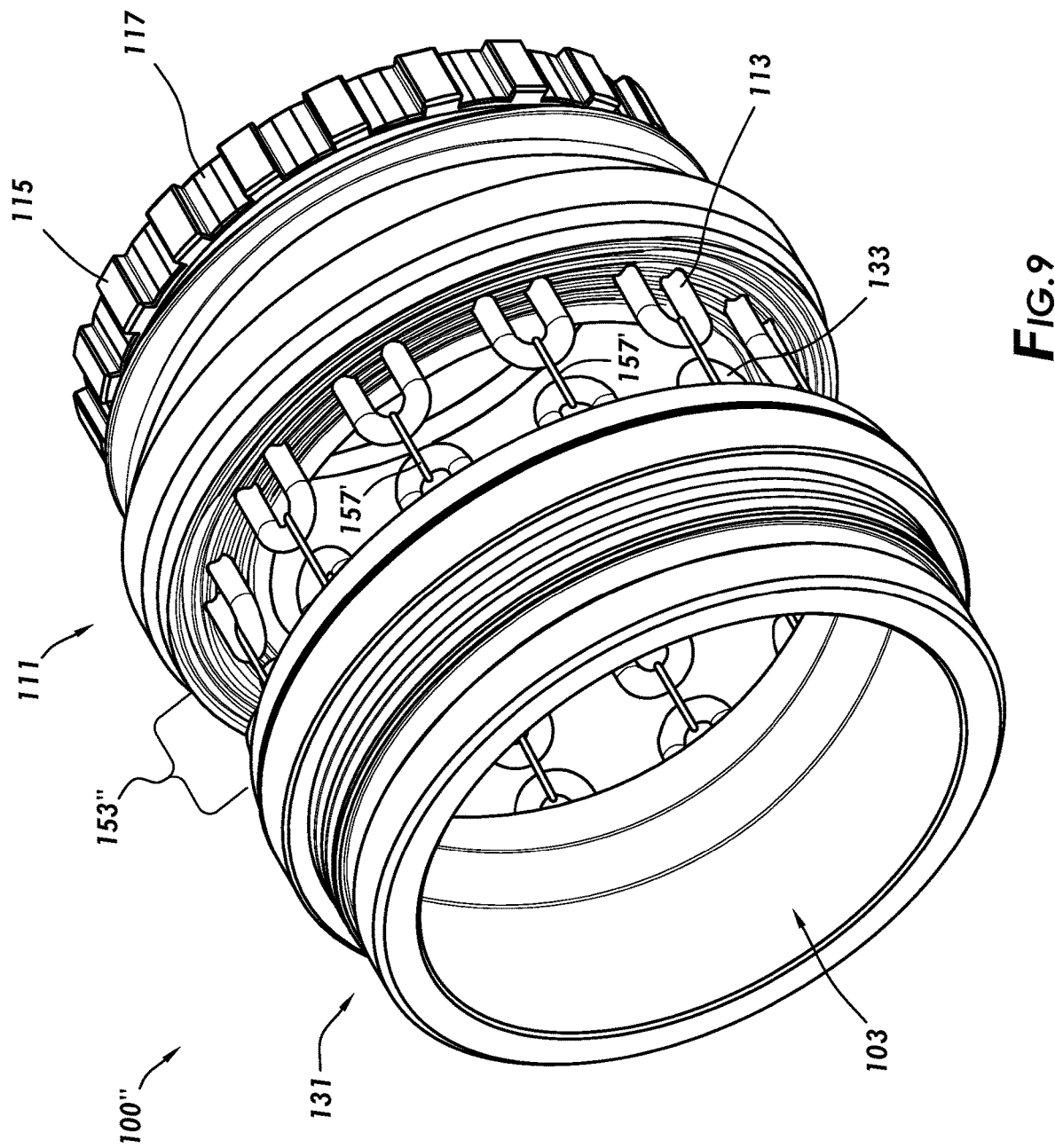
FIG. 9 depicts a flexible coupling consistent with at least one embodiment of the present disclosure.

In some embodiments, as discussed above, rigid linkages 153 may be formed from chain links. In other embodiments, as depicted in FIG. 8, rigid linkages 153' of flexible coupling 100' may be formed from one or more strands of wire 157. In some such embodiments, wire 157 may be woven between input attachment points 113 and output attachment points 133. In such an embodiment, wire 157 may be allowed to slide relative to input attachment points 113 and output attachment points 133, thereby allowing for operation of flexible coupling 100' despite misalignment between input coupler 111 and output coupler 131. In other embodiments, as depicted in FIG. 9, rigid linkages 153" of flexible coupling 100" may be formed from wires 157' that may be connected directly between input attachment points 113 and output attachment points 133. In some embodiments, a combination of woven wires 157 and straight wires 157' may be used in a single flexible coupling 100'.

Figure 10:
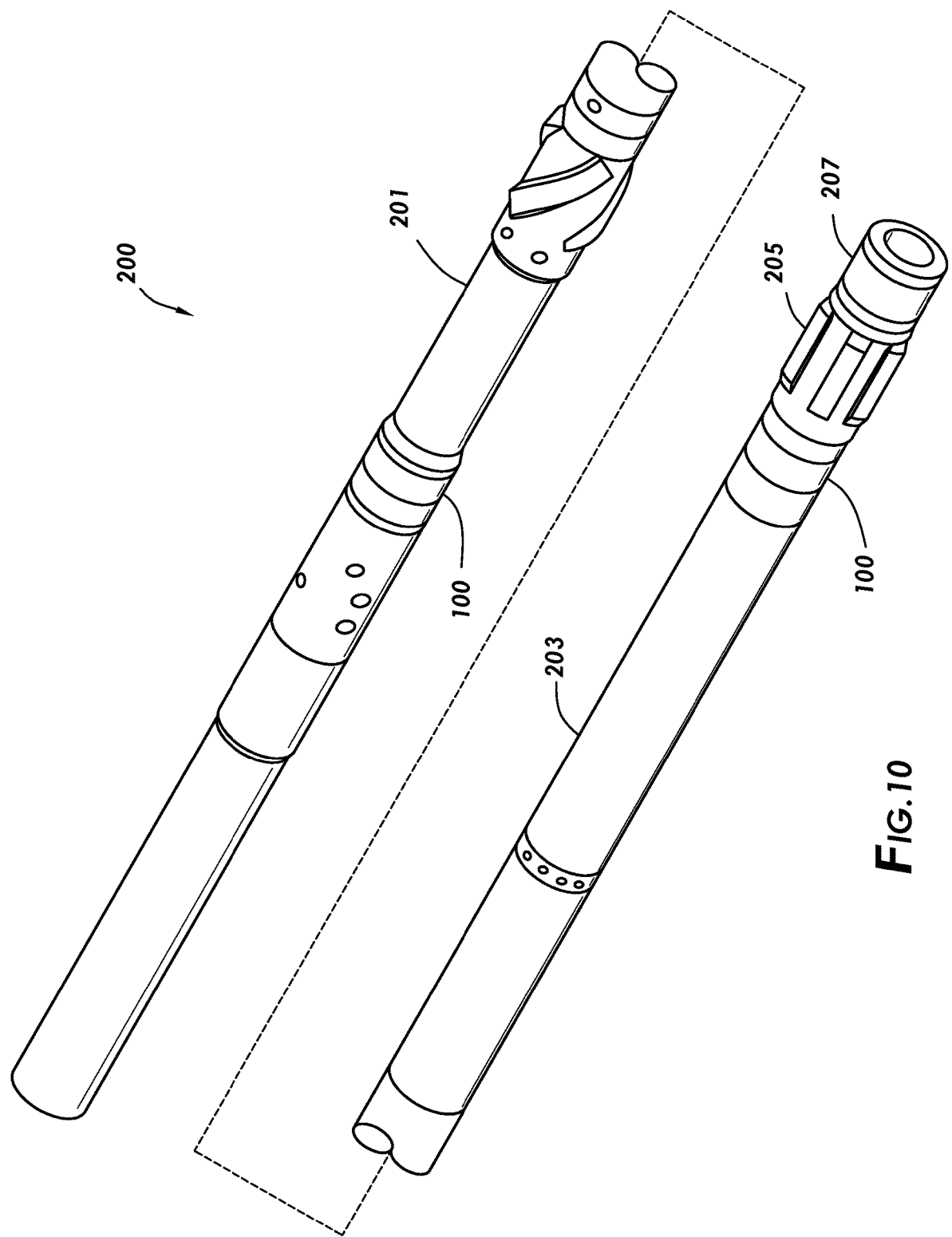
FIG. 10 depicts a rotary steering tool including a flexible coupling consistent with at least one embodiment of the present disclosure.

In some embodiments, flexible coupling 100 may be used as part of a downhole tool such as bottom hole assembly (BHA) 200 as shown in FIG. 10. BHA 200 may include, among other elements, downhole motor 201, bearing assembly 203, rotary steerable system (RSS) 205, and bit shaft 207. In some embodiments, one or more components of BHA 200 may be coupled together by flexible coupling 100. Traditionally, such components are coupled together using rigid, threaded connections. By including flexible coupling 100 between components of BHA 200, lateral and torsional stiffness of BHA 200 may be reduced. Without being bound to theory, a reduction in lateral and torsional stiffness of BHA 200 may, for example and without limitation, reduce stress on components of BHA 200 such as while passing through curved or otherwise tortuous sections of a wellbore. The reduction in torsional stiffness may, for example and without limitation, reduce the transmission of torsional vibration through BHA 200. In some embodiments, for example and without limitation, flexible coupling 100 may be positioned between a mud motor and a directional drilling BHA. In some embodiments, flexible coupling 100 may be positioned to couple shock sensitive elements of a drill string to the rest of the drill string including, for example and without limitation, a logging while drilling (LWD) system, measurement while drilling (MWD) system, or rotary steerable system (RSS).

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A flexible coupling comprising:
   an input coupler, the input coupler including an inner face;
   an output coupler, the output coupler including an inner face; and
   a plurality of rigid linkages, each rigid linkage coupled between an input attachment point coupled to the inner face of the input coupler and an output attachment point coupled to the inner face of the output coupler, each rigid linkage pivotably and slidably coupled to the input attachment point and the output attachment points,
   wherein the inner face of each of the input coupler and the output coupler includes a plurality of mounting holes positioned to receive the input attachment points and output attachment points, respectively, and
   wherein the mounting holes of the output coupler are formed deeper than the mounting holes of the input coupler.

2. The flexible coupling of claim 1, wherein each rigid linkage comprises a chain link.

3. The flexible coupling of claim 1, further comprising a flexible linkage, the flexible linkage positioned in a space defined between the inner face of the input coupler and the inner face of the output coupler.

4. The flexible coupling of claim 3, wherein the flexible linkage is molded into the space between the inner face of the input coupler and the inner face of the output coupler and about the rigid linkages.

5. The flexible coupling of claim 4, wherein the flexible linkage is positioned at least partially within a retention slot formed in the input coupler or output coupler.

6. The flexible coupling of claim 4, wherein the inner face of the input coupler or the inner face of the output coupler includes a groove, wherein the flexible linkage is positioned at least partially within the groove.

7. The flexible coupling of claim 3, wherein the flexible linkage is formed from an elastomer such as rubber.

8. The flexible coupling of claim 1, wherein the input coupler further comprises an input adapter, the input adapter including a spline.

9. The flexible coupling of claim 1, wherein the output coupler further comprises an output adapter, the output adapter including a thread.

10. The flexible coupling of claim 1, wherein each rigid linkage comprises a wire.

11. The flexible coupling of claim 10, wherein the plurality of rigid linkages comprises woven wires.

12. A method of assembling a flexible coupling comprising:
    providing an input coupler, the input coupler including an inner face, wherein the inner face of the input coupler includes a plurality of mounting holes positioned to receive input attachment points;
    providing an output coupler, the output coupler including an inner face, wherein the inner face of the output coupler includes a plurality of mounting holes positioned to receive output attachment points, wherein the mounting holes of the output coupler are formed deeper than the mounting holes of the input coupler;
    providing a plurality of rigid linkages;
    linking each rigid linkage of the plurality of rigid linkages to an input attachment point of the plurality of input attachment points;
    coupling each input attachment point to the inner face of the input coupler by inserting each such input attachment point into at least one mounting hole of the plurality of mounting holes of the inner face of the input coupler;
    linking each rigid linkage of the plurality of rigid linkages to an output attachment point of the plurality of output attachment points; and
    coupling each output attachment point to the inner face of the output coupler by inserting each such output attachment point into at least one mounting hole of the plurality of mounting holes of the inner face of the output coupler.

13. The method of claim 12, further comprising:
    molding a flexible linkage into the space between the inner faces of the inner and outer couplers and about the plurality of rigid linkages.

14. The method of claim 12, further comprising transferring torque between the input coupler and the output coupler.

15. The method of claim 12, wherein each rigid linkage comprises a chain link.

16. The method of claim 12, wherein each rigid linkage comprises a wire.

* * * * *